Oct. 30, 1962   J. DE KONING   3,061,099
SAND PREPARING PROCESS
Filed June 12, 1959   2 Sheets-Sheet 1

Oct. 30, 1962   J. DE KONING   3,061,099
SAND PREPARING PROCESS
Filed June 12, 1959

3,061,099
SAND PREPARING PROCESS
Jan de Koning, Amsterdam, Netherlands, assignor to Stamicarbon N.V., Heerlen, Netherlands
Filed June 12, 1959, Ser. No. 819,903
6 Claims. (Cl. 209—281)

The present invention relates ot a process of preparing sand for use in concrete aggregates and from sand recovered from suitable natural deposits e.g. from the fluvioglacial and pleistocene sand strata occurring in the northern half of the Netherlands.

Concrete sand has to satisfy exceptionally high demands as regards particle size distribution and fineness modulus. In determining the fineness modulus use is made of a number of screens of decreasing mesh, on which the concrete sand is screened, after which the percentage residue remaining on each screen is ascertained. Preferably, screens are used with mesh sizes successively decreasing substantially in the ratio 2:1. Such a series of screens may, for example, have the following successive mesh sizes (in mm.): 23, 11.2, 5.6, 2.8, 1.4, 0.600, 0.300, 0.150.

The sum of the combined weights of material remaining on all of these screens, expressed in a weight percentage and divided by 100, is the fineness modulus of the material. For concrete sand this modulus preferably should be between 2.1 and 3.0.

The significance of the fineness modulus is illustrated by the following table. The figures given there have been obtained by using equipment according to the invention.

| Mesh | | | |
|---|---|---|---|
| 5.6 mm. | 2.0% | (a) $a$ | = 2.0 |
| 2.8 | 3.0 | (b) $a+b$ | = 5.0 |
| 1.4 | 15.0 | (c) $a+b+c$ | = 20.0 |
| 0.6 | 29.0 | (d) $a+b+c+d$ | = 49.0 |
| 0.3 | 30.0 | (e) $a+b+c+d+e$ | = 79.0 |
| 0.15 | 18.0 | (f) $a+b+c+d+e+f$ | = 97.0 |
| | | Total | 252 |

The fineness modulus is $\frac{252}{100} = 2.52$.

It follows that a rise in the content of coarse particles in the concrete sand results in a rise of the fineness modulus, whereas if the percentage of fine particles is raised, there is a corresponding fall of the fineness modulus. If it is desired to keep the fineness modulus below 3.0, care will have to be taken to maintain a reasonably high percentage of the finest particles. The percentages of the particles remaining on the 0.6, 0.3, and 0.15 mm. screens (d, e, and f) in the above table are taken into account three times, twice, and once, respectively, in the calculation of the fineness modulus.

In addition to the abovementioned requirements concerning the limits of the fineness modulus, other demands are also made (e.g. by the competent authorities) on sand used in concrete aggregates. For instance, it is sometimes prescribed that the throughput of the 0.3 mm. screen shall be at least 7.5% and at most 20%, that of the 0.15 mm. screen at most 5%; and that the residue on the 5.6 mm. screen, like that of the 2.8 mm. screen, shall be at most 5%.

It need hardly be said that particles of the above sizes should be present in sufficient quantities in the starting material. At least 5% of the starting material should consist of particles of 2.8 mm. and bigger, 5% of particles of 150µ and smaller, while this material should have a coefficient of uniformity of 1.6 or higher.

The "coefficient of uniformity" is a known concept; it is defined as the quotient of the mean and the size-indicative particle diameters, the "mean particle size" being the aperture size of a screen at which 60% passes through the screen, and the "size-indicative particle diameter" being equal to the aperture size of a screen at which 10% passes through.

The above requirements are fulfilled e.g. by the sands mentioned in the initial part of the present specification.

The size of the 60% particle of the sand mentioned in the example is e.g. 0.285 mm., the size of the 10% particle 0.150 mm., while the coefficient of uniformity of this sand is 1.9.

The fineness modulus of the starting product defined in the following table was 1.6, which is too low a figure for concrete sand.

| Mesh | | | |
|---|---|---|---|
| 23 mm. | 1% | (a) $a$ | 1 |
| 11.2 | 1 | (b) $a+b$ | 2 |
| 5.6 | 2 | (c) $a+b+c$ | 4 |
| 2.8 | 2 | (d) $a+b+c+d$ | 6 |
| 1.4 | 2 | (e) $a+b+c+d+e$ | 8 |
| 0.6 | 4 | (f) $a+b+c+d+e+f$ | 12 |
| 0.3 | 25 | (g) $a+b+c+d+e+f+g$ | 37 |
| 0.15 | 53 | (h) $a+b+c+d+e+f+g+h$ | 90 |
| | | Total | 160 |

Heretofore, sand for use in concrete aggregates has usually been prepared by processing river sand which, from a previous screen analysis, was known to be directly suitable for the purpose; this involved the necessity of finding strictly specified, very limited deposits.

The recovery of concrete sand from deposits outside the present rivers was previously considered to require too much labor and to be uneconomic, in spite of the fact that the demands made on concrete sand had already been lowered because, from the point of view of water engineering, it was necessary to restrict the extraction of sand from large rivers.

The present invention provides a simple process for the direct preparation of concrete sand not only from sands extracted from rivers, but also from sand extracted from other suitable natural deposits, with the resulting product not only satisfying the highest demands now made, but even remaining well within the limits of the strictest requirements as regards particle size distribution and fineness modulus.

The invention also relates to equipment used for carrying out the process referred to, and further to an installation for the winning of sand, in particular to a suction dredger with its accessories especially designed to use the process referred to.

According to the invention, concrete sand is prepared from sand extracted from suitable natural deposits (1) by feeding a suspension of the raw sand in water in a tangential direction onto at least one fixed, sloping screen—hereinafter to be called the "primary" screen—whose apertures, as viewed in the direction in which the material travels, measure 10–14 mm., while, as viewed in the direction normal to that in which the material travels, they are equally as wide as, or wider than the abovementioned dimension, and (2) by feeding the undersize material coming from this screen in a tangential direction onto at least one fixed, sloping screen—hereinafter to be called the "secondary" screen—whose apertures, as viewed in the direction in which the material travels, measure 1–3 mm., while, in the direction normal to that just mentioned, they are either equally as wide as, or wider than this dimension.

In this process, the concrete sand is obtained in the wet state as the oversize material from the secondary screen or screens; the residue on the primary screen or screens is coarse material, from which, if a suitable starting product is used, concrete gravel can be obtained by washing; and the undersize material coming from the secondary screen or screens is wet fine sand, which is particularly suitable for being pumped onto building sites etc. which have to be raised.

It should be noted that the screens, per se, used in the process according to the invention are generally known (cf. the Dutch Patent Nos. 80,683 and 83,108); however, as far as is known, screens of the type referred to herein with an essential mesh width of not less than 10–14 mm. have never been used.

The concentration of the starting suspension may vary during the winning. As the secondary screens are provided with feed tanks in which the suspension, depending on the supply to these tanks, reaches a certain level determining the feed rate of the suspension supplied to the screens, variations of short duration in this concentration, which are generally accompanied by variations in the feed rate, will automatically be compensated for. The matter is different, however, if sand having a concentration deviating from that of the average starting product is supplied to the installation for a longer time. This may result in an adverse effect on the percentage of the finest particle sizes in the final product—i.e. the overflow from the secondary screen or screens—the percentage of these smallest particle sizes becoming too low and the fineness modulus too high; this may happen e.g. if the concentration of the starting suspension is too high. It has been found that in this case the overflow from the secondary screen becomes too dry.

The material then tends to remain on the section of the screen nearest the delivery end, from which it is pushed off by the flowing sand as the process continues.

An object of the present invention is to provide means preventing an undesired composition of the concrete sand as a result of deviation of relatively long duration in the concentration of the starting suspension.

According to the invention, the particle size distribution in the final product is controlled through control of the concentration of the final product flowing across the delivery end of the screen or screens with the smallest mesh. Preferably, the control of this concentration is effected by controlling the ratio of the effective screen length of the screen or screens with the smallest mesh to the thickness of the layer of suspension supplied onto this screen or these screens, as the case may be. If the layer is made thicker, e.g. by widening the slot through which the material is supplied, or by supplying extra water onto the feed end of the screen outside the slot, proportionally more liquid will flow across the delivery end of the screen, and, since this liquid contains the finest particles, a final product with the desired particle size distribution will thus be obtained from the product supplied to the screen or screens.

Conversely, if the layer is made thinner, which is done by narrowing the slot, the concentration of the final product will be raised and fewer fine particles will get into the overflow fraction.

Another solution according to the invention includes providing for adjustment of the effective screen length in accordance with requirements.

Further objects and advantages of the invention will be in part obvious and in part pointed out hereinafter.

The novel features of the invention may be best made clear from the following description and accompanying drawings in which.

Figure 1:
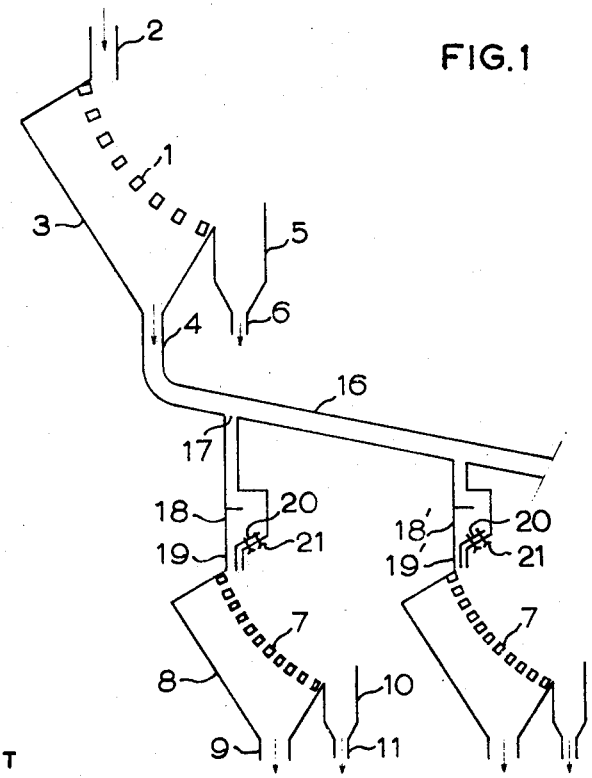
FIG. 1 is a diagrammatic view showing an apparatus embodying the invention and in which the process according to the invention can be carried out.

According to embodiment of the invention illustrated in FIG. 1, equipment for processing the starting product comprises a curved bar screen 1 with horizontal bars and wide slots, say 12 mm. in width, which bar screen is provided with a suitable tangential feed device 2 at its upper end, for supplying the sand and gravel obtained by means of a suction dredger or sand pump dredger. At the delivery end of the screen 1 there is a collecting tank 5 for the coarser material retained on the screen, and a discharge conduit 6.

Under the screen 1 there is a collecting tank 3 for the undersize fraction from the said screen, which tank has a discharge conduit 4 debouching or opening into a sloping chute 16. This chute is shown as being joined in any appropriate manner to a number of secondary curved screens 7 with horizontal bars spaced, say, 2 mm. apart.

Each of these secondary screens, two of which are shown, is fed from a feed tank 18 or 18′, whose upper end communicates with a slot 17 in the chute 16. Each feed tank 18 or 18′ has a mouth 19 or 19′ of rectangular section, with a slot-like opening whose length is equal to the width of the screens 7, and which debouches tangentially onto this screen. The width of this slot determines the thickness of the layer of suspension fed onto the screen.

The screens 7 each have a collecting tank 8 with a discharge 9 for the undersize fraction, which may be pumped onto building sites etc. that are to be raised. The residue coming from screens 7, which is the concrete sand, is caught in a hopper 10 at the end of screen 7, and discharged through conduit 11.

In the mouth 19 of the left-hand feed tank 18 shown in FIG. 1, a plate 20, the upper part of which is bent back or inclined as shown, is mounted so as to be displaceable. The width of the slot-like opening at 19 and hence the thickness of the layer of suspension fed onto the screen therethrough can be controlled by means of this plate 20. For this purpose, the upper, inclined part of the plate 20 is provided with bolts and wing nuts 21 arranged as shown. These bolts pass through slots (not shown) in the sloping bottom of the feed tank, enabling the plate 20 to be displaced for controlling the slot width, and to be fixed in the proper adjusted position, as will be evident.

Outside the mouth 19′ of the feed tank 18′, a conduit 22 is shown. This conduit is perforated at regular intervals along its underside. These perforations are so disposed that liquid supplied through the conduit 22 discharges from them in a direction substantially parallel to that in which the suspension issues through the slot-like opening of the mouth 19′, as indicated by the arrow.

The operation of the aforedescribed equipment will now be explained.

The sand and gravel drawn from an artificial pool by a suction dredger, is supplied to screen 1 at 2. The gravel, which for the greater part is coarser than the rest of the material, is caught in hopper 5 and discharged through conduit 6. The undersize fraction from screen 1, which is caught in collecting tank 3 and consists of the greater part of the water which the sand and fine gravel contained in it, flows through conduit 4 and into chute 16, whence it is fed through a number of openings 17 into feed tanks 18, 18′. If the feed tanks are provided with a mouth 19 in which a plate 20 is provided for controlling the slot width, this plate is in an intermediate position. If it should now appear that the suction dredger for a longer time supplies a product of which the solid matter concentration is too high—which appears from the overflow from screen 7 being too dry—as a result of which the overflow fraction contains too few fine particles, the slot is widened by adjusting the plate 20. As a result, the layer of suspension flowing over the screen will become thicker, and proportionally more liquid, which contains the finer particles, will be discharged as overflow material. This results in a lowering of the fineness modulus. In this way the fineness modulus of the concrete sand, i.e. the overflow fraction from screen 7, can be kept below the highest permissible value. Conversely, narrowing of the slot is applied to raise the fineness modulus to above the lowest permissible value.

With the construction comprising the feed tank 18', the layer of suspension flowing out of the slot of mouth 19' may be made thicker—and hence the finess modulus of the overflow fraction altered—by supplying water through conduit 22 onto this layer of suspension. However, with this construction it is impossible to alter the fineness modulus if the concentration is too low. However, in most cases the pumping of suspensions too low in concentration will be avoided, as this implies a waste of energy.

The device for controlling the slot width at 19 may be altered in various ways, without departing from the scope of the invention as should be evident.

Figure 3:
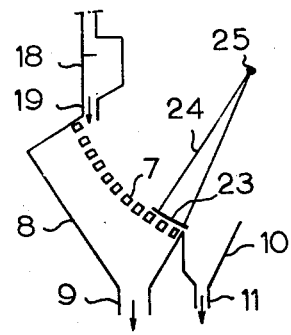
FIGURE 3 is a diagrammatic elevation view of a modified embodiment of the apparatus shown in FIGURE 1; and, FIGURE 4 is a modification of the screening apparatus conforming generally to the right-hand screen assembly shown in FIGURE 1.

Referring now to FIGURE 3, a plate 23 is pivotally mounted about an axis 25 by means of rods 24 so as to close off a portion of the screening surface of the deck 7.

Figure 4:
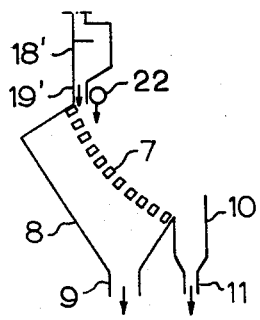

In FIGURE 4, still a further modification is shown as appears in FIGURE 1 on the right-hand or second screen.

EXAMPLE

Equipment illustrated diagrammatically in the drawing was used for treating a suspension of sand recovered, by means of a suction dredger floating on an artificial pool, from a sand formation from which the dredger, in one pass, extracted sands from fluvioglacial and young and old pleistocene strata. The sand concentration of the suspension pumped up was 400 kg. per cubic metre.

Screen 1 had a radius of curvature of 750 mm. and screening bars 16 mm. in width, spaced 12 mm. apart.

The screens 7 each had a radius of 500 mm., their bars being 4.5 mm. wide and being spaced 2 mm. apart.

The capacity of screen 1 was 800 cu. m. of suspension per hour and per sq. m. of screen surface, that of screens 7 was 380 cu. m. of suspension per hour and per sq. m. of screen surface.

Figure 2:
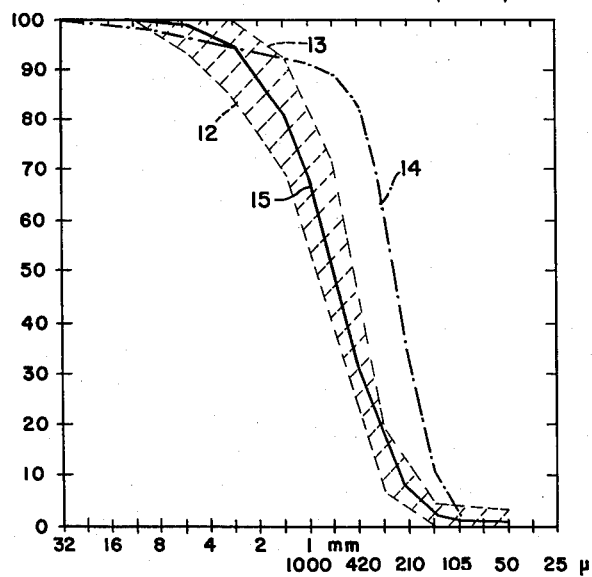
FIG. 2 is a graph of the screen analyses of the starting product and the concrete sand eventually obtained.

The discharge conduit 11 deliver wet concrete sand of very high quality; the solid matter contained in this discharge product comprised about 12% of the solid matter contained in the original raw sand, which corresponded to the theoretical amount calculated from the particle size distribution curve of the starting materail. The result obtained with the process appears in FIG. 2, which is a graph of the screen analyses of starting material and resulting concrete sand. The abscissa shows on a logarithmic scale the mesh sizes in mm. and microns, and the ordinate shows the cumulative undersize fraction of a series of screens with predetermined decreasing aperture sizes for determining the distribution of the particle sizes in a sample of the concrete sand collected as overflow fraction of screen 7, in percentages of the total amount of solid matter in said sample.

The hatching between the lines 12 and 13 represents the range within which the demands made, e.g. in the Netherlands, relative to the maximum and minimum throughput percentages for given mesh sizes, and the fineness modulus, are satisfied.

Line 14 shows the particle size distribution in the starting material, and line 15 shows the particle size distribution in the sand discharged through conduit 11.

The graph shows that:

(a) The starting product is absolutely unsuitable for use in concrete aggregates;

(b) The product discharged through conduit 11 satisfies not only the demands made on concrete sand, but also essentially higher demands, since the particle size distribution curve of the resulting product is about halfway between the limits set, and the fineness modulus is 2.5.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

What is claimed is:

1. A process for preparing concrete sand from sand recovered from suitable natural deposits comprising the steps of: feeding raw sand suspended in water in a tangential direction onto at least one fixed, sloping primary screen having apertures which, as viewed in the direction the material travels, measure 10–14 mm. while, as viewed in the direction normal to which the material travels, said apertures are at least as wide as the above-mentioned dimension, and supplying the undersized material from said screen in a tangential direction onto at least one fixed, sloping secondary screen having apertures, as viewed in the direction in which the material travels, measure 1–3 mm. while, as viewed in the direction normal to said latter dimension, said apertures are at least as wide as said last-mentioned dimension, and obtaining the desired percentage of the finest particles in the concrete sand in a wet state as the overflow product from the latter screen through control of the concentration of solid matter in the overflow fraction coming from the latter screen.

2. Process according to claim 1, characterized in that the control of the concentration of the final product is effected by controlling the ratio of the effective screen length of the secondary screen to the amount of suspension fed onto this screen per unit time.

3. Process according to claim 2, characterized in that the said amount can be controlled through control of the thickness of the layer of suspension fed onto the secondary screen.

4. Process according to claim 3, characterized in that the thickness of the layer of suspension is controlled through control of the width of the slot through which the suspension is fed onto the secondary screen.

5. Process according to claim 4, characterized in that the thickness of the layer of suspension is controlled by supplying additional liquid to this layer at the feed end of the secondary screen.

6. Process according to claim 2, characterized in that the said ratio is controlled through adjustment of the effective screen length.

References Cited in the file of this patent

UNITED STATES PATENTS

| | | |
|---|---|---|
| 594,041 | Strong | Nov. 23, 1897 |
| 2,748,941 | Fontein | June 5, 1956 |
| 2,860,782 | Fontein | Nov. 18, 1958 |
| 2,872,041 | Fontein | Feb. 3, 1959 |
| 2,916,142 | Fontein | Dec. 8, 1959 |
| 2,917,174 | Fontein | Dec. 15, 1959 |

FOREIGN PATENTS

| | | |
|---|---|---|
| 83,109 | Netherlands | Oct. 15, 1956 |
| 469,241 | Canada | Nov. 7, 1950 |
| 801,212 | Great Britain | Sept. 10, 1958 |